US006226630B1

(12) United States Patent
Billmers

(10) Patent No.: US 6,226,630 B1
(45) Date of Patent: May 1, 2001

(54) METHOD AND APPARATUS FOR FILTERING INCOMING INFORMATION USING A SEARCH ENGINE AND STORED QUERIES DEFINING USER FOLDERS

(75) Inventor: Meyer Alvin Billmers, Lexington, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/120,780

(22) Filed: Jul. 22, 1998

(51) Int. Cl.[7] ................................................. G06F 17/30
(52) U.S. Cl. ............................... 707/3; 345/968; 707/204
(58) Field of Search .................................. 345/356, 968, 345/333; 707/3–7, 206, 1, 200, 500, 201, 219, 229, 225

(56) References Cited

U.S. PATENT DOCUMENTS

| | | | |
|---|---|---|---|
| 5,283,856 | * | 2/1994 | Gross et al. ............................ 395/51 |
| 5,555,346 | * | 9/1996 | Gross et al. ............................ 395/51 |
| 5,727,175 | * | 3/1998 | Malone et al. ....................... 395/356 |
| 5,765,170 | * | 6/1998 | Morikawa ............................ 707/200 |
| 5,802,253 | * | 9/1998 | Gross et al. ............................ 395/51 |
| 5,802,314 | * | 9/1998 | Tullis et al. ..................... 395/200.76 |
| 5,802,518 | * | 9/1998 | Karaev ..................................... 707/5 |
| 5,900,870 | * | 5/1999 | Malone et al. ....................... 345/333 |
| 5,920,854 | * | 7/2000 | Kirsch et al. ............................ 707/3 |
| 5,966,714 | * | 10/1999 | Huang et al. ....................... 707/201 |
| 5,974,409 | * | 10/1999 | Sanu et al. ................................ 707/3 |
| 5,999,932 | * | 12/1999 | Sunil ..................................... 707/10 |
| 6,009,462 | * | 12/1999 | Birrell et al. ....................... 709/206 |
| 6,012,053 | * | 1/2000 | Pant et al. ................................ 707/3 |
| 6,029,164 | * | 2/2000 | Birell et al. .............................. 707/3 |
| 6,029,165 | * | 2/2000 | Gable ....................................... 707/3 |
| 6,055,526 | * | 4/2000 | Ambroziak ............................... 707/2 |
| 6,058,389 | * | 5/2000 | Chandra et al. .......................... 707/1 |
| 6,070,158 | * | 5/2000 | Ainsbury et al. ..................... 707/101 |
| 6,073,142 | * | 6/2000 | Geiger et al. ......................... 707/500 |
| 6,092,101 | * | 7/2000 | Birrell et al. ......................... 709/206 |

* cited by examiner

*Primary Examiner*—John Breene
(74) *Attorney, Agent, or Firm*—Hamilton, Brook, Smith & Reynolds, P.C.

(57) ABSTRACT

A new system for organizing received messages for a user does not require the user to examine and categorize each received message, and enables the user to conveniently and efficiently modify filtering rules used to define folders that organize received messages. The system includes a received information database for storing received messages. One or more message filters are provided, for example where a separate message filter is provided to handle each specific message source or message type. Each message filter generates indices corresponding to portions of the received messages it processes. The message filters store the indices into a database index such that the indices are associated with the message and message portions to which they correspond. The system includes a plurality of message folders, such that received messages are organized based on a predetermined set of message characteristics. The system stores a search query within each folder. When the user requests to view the contents of a given folder, the search query for that folder is passed to a search engine. The search engine generates search results based on the search query and a search of the received message index. Messages are thus associated with the given folder, as defined by the search query, and appear to the user to be contained within that folder. In an example embodiment, the system includes an alert engine which periodically determines whether a message has been received that matches alert characteristics provided by the user.

60 Claims, 9 Drawing Sheets

ACTIVITIES OF THE QUERY GUI

ACTIVITIES OF THE VIEWING GUI

QUERY GUI OPERATION TO GENERATE
ALERT QUERIES

ALERT ENGINE OPERATION

FILTERING RULE DESCRIPTION (CLICK TO EDIT)

FILTER
ORDER

1   IF SUBJECT CONTAINS URGENT THEN SAVE IN FOLDER URGENT!!!

2   IF SOURCENAME CONTAINS REC.GAMES.CHESS THEN SAVE IN FOLDER HOBBIES--CHESS

3   IF BODY CONTAINS d4 AND IF BODY CONTAINS OPENING THEN SAVE IN FOLDER HOBBIES--CHESS (OPENINGS WITH 1.d4)

4   IF BODY CONTAINS REC.FOLK-DANCING THEN SAVE IN FOLDER HOBBIES--DANCE

5   IF BODY CONTAINS REC.FOOD.COOKING THEN SAVE IN FOLDER HOBBIES--COOKING

6   IF SUBJECT CONTAINS RECIPE OR RECIPIES THEN SAVE IN FOLDER HOBBIES--COOKING (RECIPIES)

HELP

CLOSE

 [NEW] MESSAGE FOLDERS
 [18] HOBBIES -- CHESS
 [47] HOBBIES -- DANCE
 [1] HOBBIES -- CHESS (OPENINGS WITH 1. d4)
 [45] HOBBIES -- COOKING
 [4] HOBBIES -- COOKING (RECIPIES)
 [8] URGENT!!!
170
FIG. 9

METHOD AND APPARATUS FOR FILTERING INCOMING INFORMATION USING A SEARCH ENGINE AND STORED QUERIES DEFINING USER FOLDERS

FIELD OF THE INVENTION

The disclosed system relates generally to information management and more specifically to a system for organizing received information into folders based on user supplied criteria.

BACKGROUND

Many computer software application programs are available today which asynchronously provide new information to a user. For example, electronic mail systems asynchronously deliver information messages that are sent by other users. The amount of information or number of messages received by many users is very large. In order to manage this large amount of information, existing systems have enabled users to organize received messages into groups sometimes referred to as folders. For example, such existing systems may initially deliver received messages into a single "Inbox" repository. After the receiving user reads each message in the inbox, the user may then move or copy the messages into one or more groups or folders defined by the user to store messages based on their characteristics, such as sender identity, subject matter, or date of receipt. In this way such existing systems attempt to provide a means for users to organize received information such that it may conveniently be retrieved or scanned later. A drawback of such systems is that in the case where a user continuously receives a large number of messages, the user must examine or read each received message in order to assign it to a group or folder other than the default folder. This necessary examination of all received messages may require an unacceptable amount of user time.

Other existing systems have applied filters to messages as they are received in order to initially store them in appropriate folders without user intervention, based on previously provided, or default message characteristics. This type of system eliminates the requirement that a user go through all received messages in order to find those that match predetermined folder characteristics. However, as a user's needs change over time, or as the nature of the received message traffic changes, any particular set of filtering rules will inevitably become obsolete. At that point, the user must change the existing filtering rules so that received messages are handled properly. Moreover, the new set of filtering rules must often be applied to all previously received messages in all existing folders as well as newly received messages. Existing systems require that the folder structure and organization be updated with at least substantial changes involving pointers and data structures representing folder organization, and potentially copying of the messages themselves. In addition, such existing systems require the user to specify a complete set of new filtering rules to define the new folder organization in its entirety. Overall, such reorganizations in existing systems are cumbersome and time consuming for the user.

Accordingly, for the reasons stated above, it is desirable to have a new system for organizing information received by a user based on user provided characteristics which does not require the user to examine and categorize each received message. The new system should provide flexibility such that filtering rules can be conveniently changed or modified. Further, the new system should not require a complicated and time consuming reorganization of all existing folders each time the filtering characteristics are changed.

SUMMARY

In accordance with principles of the invention there is disclosed a new system for organizing received information for a user, which does not require the user to examine and categorize each received message, and which enables the user to conveniently and efficiently modify filtering rules used to define folders that organize received messages. The disclosed system includes a received information database for storing received messages. One or more message filters are provided to process received messages from multiple message sources, for example where a separate message filter is provided to handle each specific message source. In an alternative embodiment, a separate message filter is provided for each different message type. Each message filter generates indices of portions of the received messages it processes. An example of such portions are individual words within the received message, thus forming a text index of the received messages. The message filter or filters store the generated indices into a database index such that the indices are associated with the message and message portions to which they correspond. The disclosed system advantageously includes a plurality of message folders, so that the asynchronously received messages are organized based on a predetermined set of message characteristics. Rather than storing messages or message pointers within each message folder, the disclosed system stores a previously defined search query within each folder. When the user requests to view the contents of a given folder, the search query for that folder is passed to a search engine. The search engine generates search results based on the search query and a search of the received message text index. The search results for example indicate those messages which match the characteristics given in the search query. Those messages are thus associated with the given folder, as defined by the search query, and appear to the user to be contained within that folder.

In an example embodiment the disclosed system further includes a graphical user interface for receiving indication of the folder for which the user desires to display associated messages, and further for displaying those messages based on the search results. In a further example embodiment a query graphical user interface is provided for inputting a search query to be entered into one of the message folders.

In another example embodiment, each received message further comprises a number of fields, and the database index is organized into sub-indexes. Each one of the sub-indexes corresponds to one of the message fields.

In another example embodiment, the system includes an alert engine which periodically determines whether a message has been received that matches alert characteristics provided by the user. In the example embodiment, the graphical user interface includes a mechanism to input message characteristics from the user that will trigger various kinds of alert events.

In this way there is disclosed a new system for organizing information received by a user based on user provided characteristics, without requiring the user to examine and categorize each received message. The new system provides flexibility such that filtering rules can be conveniently changed or modified. In this way, the disclosed system enables the user to change folder definitions for all future messages as well as all received messages without moving messages or copying messages within existing folders. Thus the new system does not require a complicated and time consuming reorganization of all existing folders each time filtering characteristics are changed.

BRIEF DESCRIPTION OF THE DRAWINGS

Other objects and advantages of the present invention will become apparent upon reading the following detailed description and upon reference to the drawings, in which:

FIG. 8 is an example embodiment of folder rules input through the user interface of FIG. 7; and FIG. 9 is an example embodiment of a display showing folders provided by the viewing GUI.

DETAILED DESCRIPTION OF THE PREFERRED EMBODIMENTS

Figure 1:
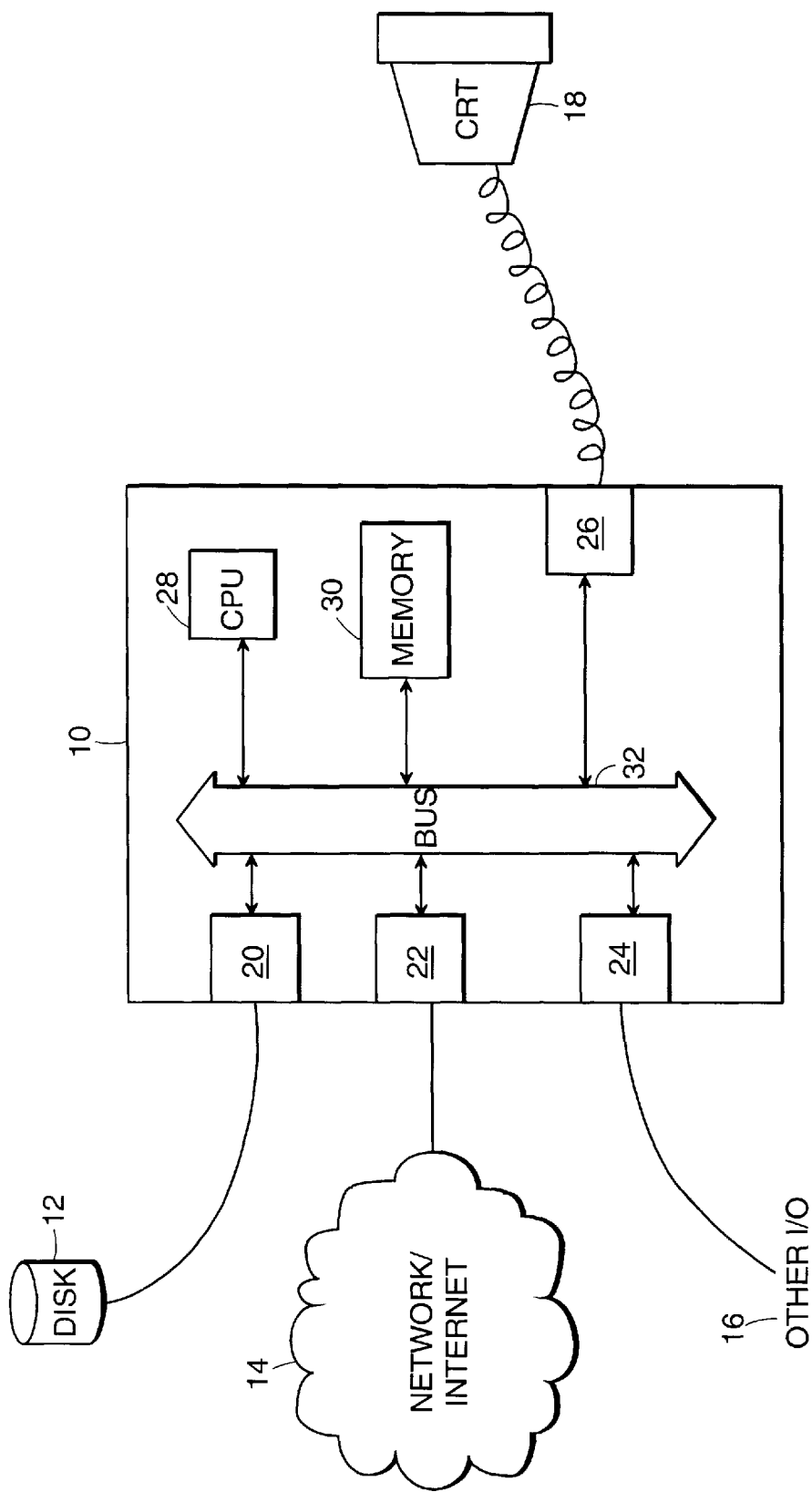
FIG. 1 is a block diagram showing an example embodiment of a computer system on which the disclosed system may be executed.

Now with reference to elements of FIG. 1, there is described an example embodiment of a Computer System 10 on which the disclosed system may be implemented. The Computer System 10 is shown including a CPU 28, Memory 30, and Communication Bus 32. The Computer System 10 is further shown connected with a Display Device 18 through an Interface 26, a Disk Storage System 12 through an Interface 20, a Computer Network or the Internet through Interface 22, and other I/O through Interface 24.

Figure 2:
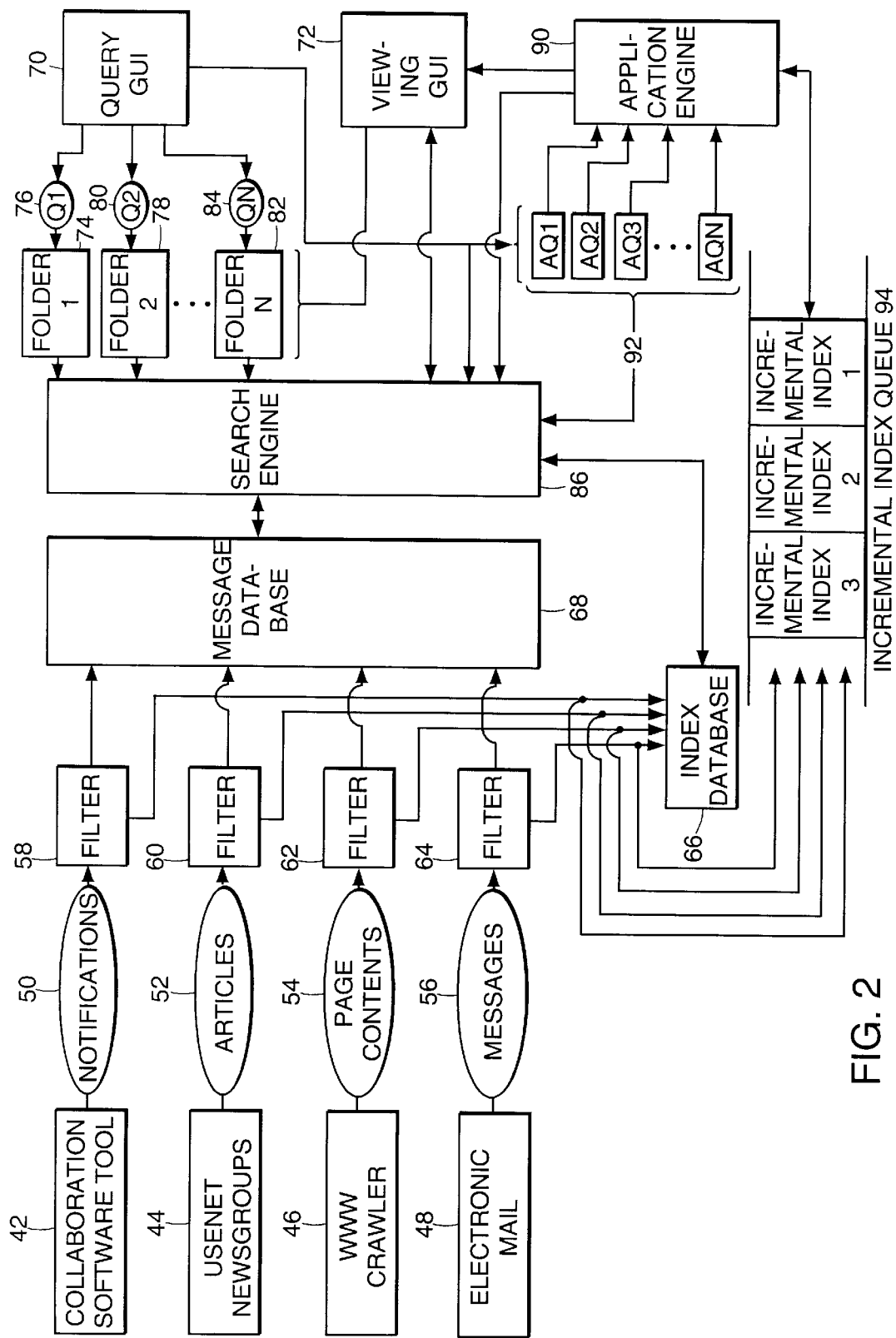
FIG. 2 is a block diagram showing an example embodiment of software components executing on the computer system shown in FIG. 1.

Now with reference to FIG. 2, there is described a number of software elements of the disclosed system capable of being read by and executed in the Computer System 10 shown in FIG. 1. In a first example embodiment, the elements of FIG. 2 are stored in the Memory 30. In an alternate embodiment, the elements of FIG. 2 are stored in a combination of Memory 30 and the Disk Storage System12. The Disk Storage System 12 and the Memory 30 are thus examples of computer readable media. In a further alternative embodiment, the Disk Storage System 12 is a computer program product from which some or all of the elements of FIG. 2 are loaded into Memory 30 for execution on the CPU 28. The Disk Storage System 12 alternatively includes a magnetic disk, optical disk, or any other appropriate storage media capable of storing computer program code and being read by the Computer System 10. It is further anticipated that some or all of the elements of FIG. 2 are alternatively loaded from a computer program storage device or computer program product having a computer readable media which is for example located within the Network/Internet 14.

The elements of FIG. 2 are shown including several example message sources, for example, a Collaboration Software tool 42, one or more Usenet Newsgroups 44, a WWW Crawler 46, and Electronic Mail 48. The Collaboration Software Tool 42 provides Notification Messages 50 to a Filter 58. The Usenet Newsgroups 44 provide Articles 52 to a Filter 60. The WWW Crawler 46 provides Page Contents 54 to a Filter 62. The Electronic Mail 48 provides Messages 56 to a Filter 64.

Each filter for a given message source generates indices of portions of each message it receives. For example, the electronic mail Messages 56 received by the Filter 64 are processed to generate indices of portions of the Messages 56, which are then passed to an Index Database 66 and a current Incremental Index at the head of an Incremental Index Queue 94, for example, Incremental Index 3. The indices stored in the Index Database 66 and the Incremental Index reflect, for example, the message ID of the message as well as indication of any subfield of the message which contains a specific portion associated with that specific index. For example, if the Filter 64 is designed to index all text words of each received message, and a message number N is received including the word "urgent" in the subject field, then the Filter 64 generates an index reflecting the location of the word "urgent" within message N, as well as indicating that the word is located in the subject field, and that the word was found in message N.

Each of the message filters (58, 60, 62, and 64) continue adding indices of portions of message they receive to a current incremental index in the Incremental Index Queue 94 until a current time period expires. At that point, a new incremental index is formed and added to the Incremental Index Queue 94. Thus, each Incremental Index in the incremental index queue contains indices of portions of messages received during one time period.

In an example embodiment of the present system, each filter performs any necessary conversion of the input message into indexable portions or tags, for example consisting of text words. For example, a filter which processed web pages provided by the WWW Crawler 46 would first convert the received HTML web page contents into text before generating an index to be sent to the Index Database 66 and current Incremental Index. In this way, the source specific message filter (58, 60, 62, and 64) forms an Index Database 66 and a number of Incremental Indices which are searchable by the Search Engine 86.

Further in FIG. 2, there is shown a Query GUI 70. The Query GUI 70 provides a user interface to receive a number of form-based rules from a user which define a set of messages to be considered in a folder. The rules are converted by the Query GUI 70 into a number of Search Queries $Q_1$ 76, $Q_2$ 80, etc. through $Q_n$ 84, which are capable of being processed by the Search Engine 86. The search queries are loaded by the Query GUI 70 into a corresponding number of folders, for example, $Folder_1$ 74, $Folder_2$ 78, through $Folder_n$ 82.

The Search Engine 92 is, for example, one modeled on the AltaVista search engine provided by Digital Equipment Corporation. Syntax of the search queries, for example, permits text words to be used in natural language form, or advantageously using Boolean operators specified by either keywords or symbols. For example, the queries stored in folders may consist of text words or strings connected using Boolean logic or relational keywords such as "AND", "OR", "NOT", or "NEAR," or their corresponding symbols (&, |, !, ~).

In alternative embodiments, the Search Engine 86 is modeled after other high speed database systems which accept search queries having Boolean and/or relational keywords in combination with searchable text or other content in order to retrieve received messages which satisfy such search queries.

A Viewing GUI 72 is further shown in FIG. 2. The Viewing GUI 72 inputs indication of a folder, for example a folder name, received from the user. In response to the input folder name, the Viewing GUI 72 reads the search query from the folder having that folder name, and executes that search query on the Search Engine 86. The Viewing GUI 72 then displays the results of the search to the user.

Further shown in FIG. 2 is an Alert Engine 90. The Alert Engine 90 operates on a number of Alert Queries 92 to provide alert events to the user. For example, the Query GUI 70 further provides the user with the ability to specify a type of event that should occur when a message is received that matches one or more conditions in the form-based rules provided by the user. For example, after the user supplies a number of form-based rules, the Query GUI 70 permits the user to indicate whether the resulting search query should be used as a folder definition or as definition of an event that triggers an alert of some type. If the user specifies an alert rather than a folder, then the search query corresponding to the input form-based rules would be stored as one of Alert Queries 92, for example, Alert Query AQ1. The user may specify that a resulting search query should be used both as a folder definition and to define an event that triggers an alert.

The Alert Engine 90 periodically executes the Alert Queries 92 using the Search Engine 86 to search the oldest incremental index in the Incremental Index Queue 94. The Alert Engine 90 then dequeues that incremental index from the Incremental Index Queue 94. In this way, the Alert Engine 90 alerts the user of when a message was received which matches one of the Alert Queries 92.

In an example embodiment, the Alert Engine 90 provides the user with a new pop-up window as an alert. Alternatively, or in addition, the alert engine may provide a sound such as a bell or some other type of alert event, for example, through Viewing GUI 72.

Figure 3:
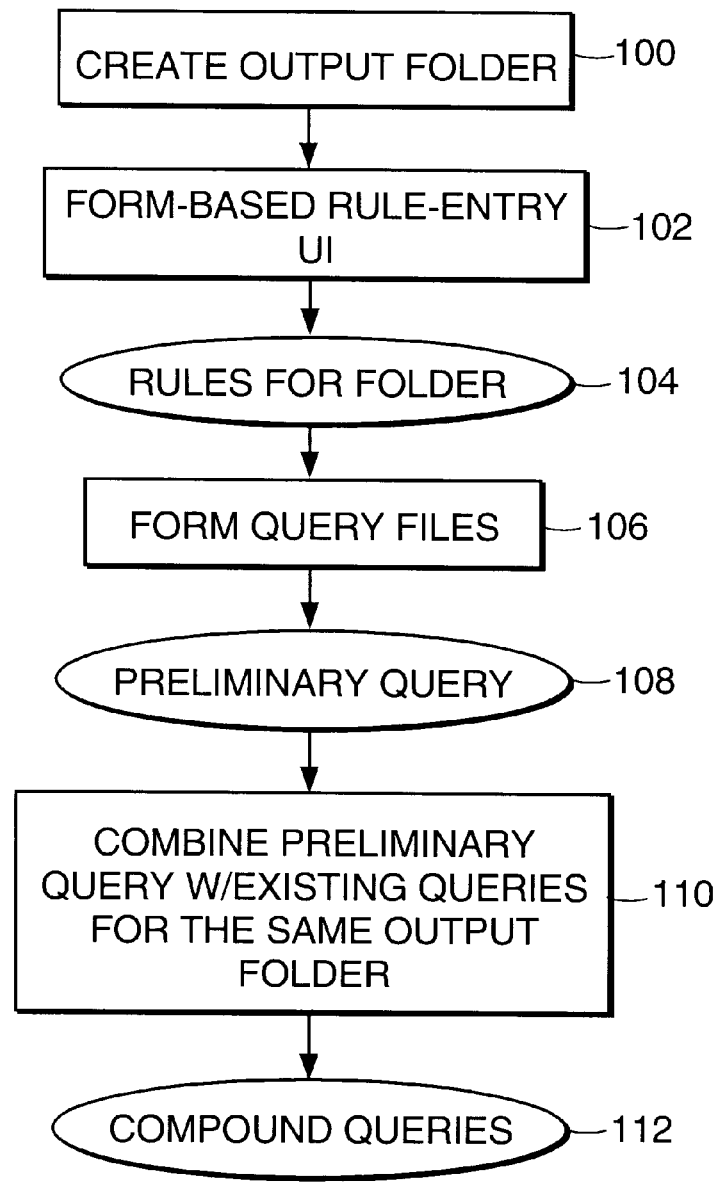
FIG. 3 is a flow chart showing an example embodiment of steps performed by the query GUI to convert form-based rules into queries.

Now with reference to FIG. 3, there is described an example of steps performed by the Query GUI 70 shown in FIG. 2. At step 100, the Query GUI creates an output folder. Step 100 may be responsive to an explicit user request to form an output folder, or may be in response to specification of an output folder in one of the form-based rules entered in step 102.

At step 102, the Query GUI inputs one or more form-based rule from the user. For example, the Query GUI presents the user with a template of an IF (condition)/THEN (action) rule which may be used to define either a folder or an alert. The output of step 102 is a Rule 104 defining the contents of a folder, for example, in logical IF (condition)/THEN (action) format. For example, the condition of the Rule 104 is a search query including searchable text or other content together with some member of Boolean or relational operators understood by the Search Engine 92. Further, for purposes of example, the action within the Rule 104 is a default article indicating that the results of the search are to be displayed as the contents of the output folder created at step 100. At step 106, the Query GUI forms one or more query files containing search queries which define the output folder specified by the user in step 102. These query files are output as preliminary query 108. For example, the Preliminary Query 108 is a search engine query including text or other content and some number of Boolean or relational operations equivalent to those found in the action portion the Rule 104.

At step 110, the query GUI combines the Preliminary Query 108 with any previously existing query files associated with the same output folder. For example, if an existing folder named "urgent" had previously been defined to include all messages having the word "urgent" in the subject subfield of a message, and a Rule 104 specified that if a message was received having the word "urgent" in its body then to include the message in the "urgent" folder, at step 110, a compound search query would be formed which would return all messages having the word "urgent" in either the body or subject field of the message. For example, step 120 would output a compound query 112 of $SUBJECT_{13}FIELD:URGENT$ OR BODY:URGENT, which would then be stored in the folder having the folder name "urgent". In the example query syntax, a keyword to the left of a colon indicates a subfield within a received message, which the information to the right of the colon is a searchable string or other content.

Figure 4:
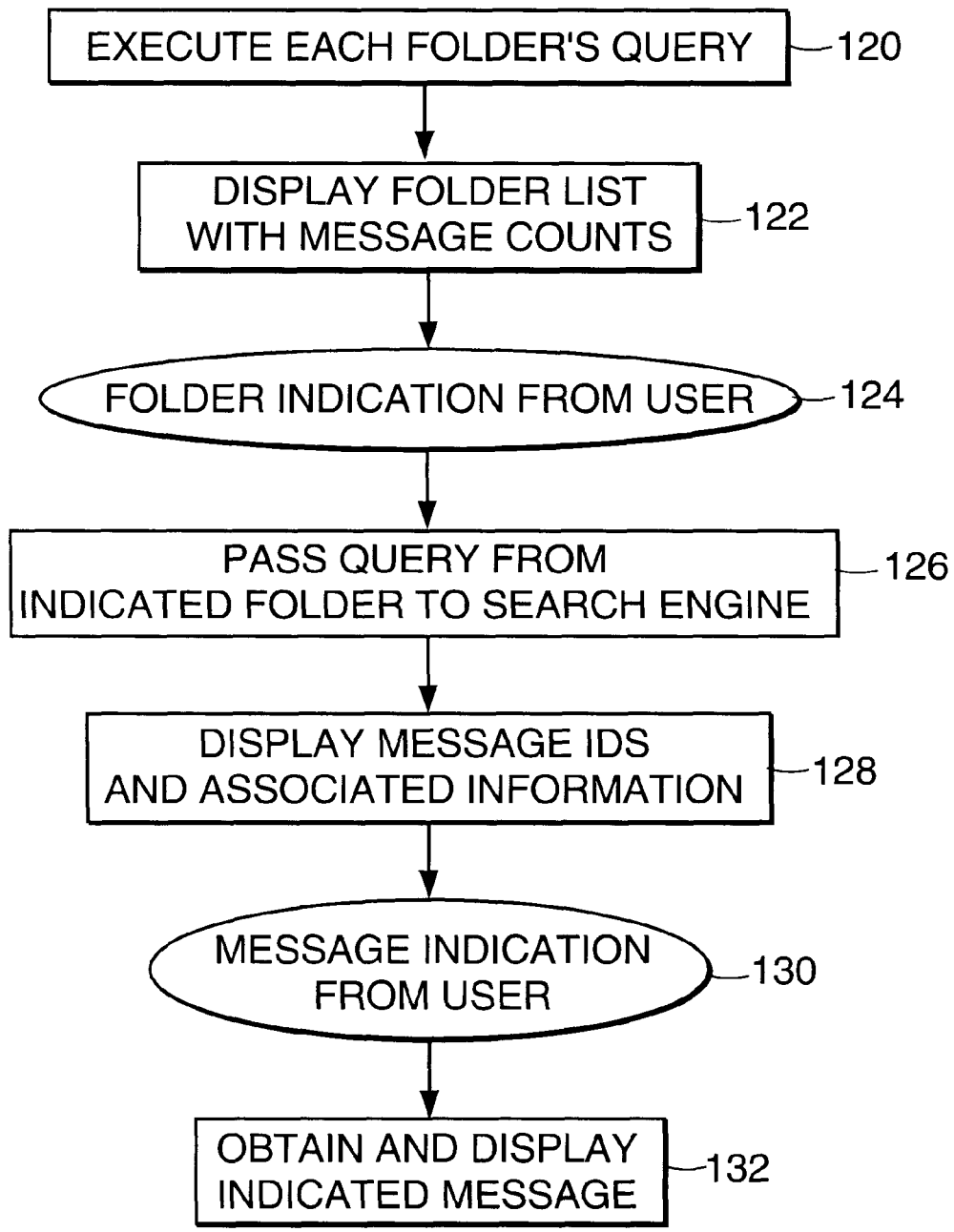
FIG. 4 is a flow chart showing an example embodiment of steps performed by the viewing GUI to display a folder list and a message contained in a folder.

Now, with regard to FIG. 4, there is described the steps performed by an example embodiment of the Viewing GUI 72 as shown in FIG. 2. The steps shown in FIG. 4 are, for example, responsive to an initial user request to display all current folders. At step 120, the viewing GUI executes the search query for each currently defined folder. For example, the viewing GUI executes a search query contained in a file corresponding to each currently defined folder. At step 122, the viewing GUI displays a list of all currently defined folders along with a count of messages which matched the searches generated by the execution of each folder's search query at step 120. The list of folders displayed at step 122, for example, includes a "hot link" or button which the user can click on in order to select each specific folder.

At step 124, the viewing GUI receives indication of one of an existing set of folders from the user, for example, by the user clicking on a folder name. The viewing GUI then, at step 126, passes the search query contained in a file associated with the indicated folder to the search engine. The search engine returns a message ID and some associated information for each message in the Message Database 68 that matches the search query. Associated information would, for example, be the title of a Usenet article or the subject line of an e-mail massage. At step 128, the viewing GUI displays the message ID and the associated information for each matching message to the user. The user then, for example, clicks on one of the message IDs at 130 and at step 132 the viewing GUI obtains and displays the indicated message.

Figure 5:
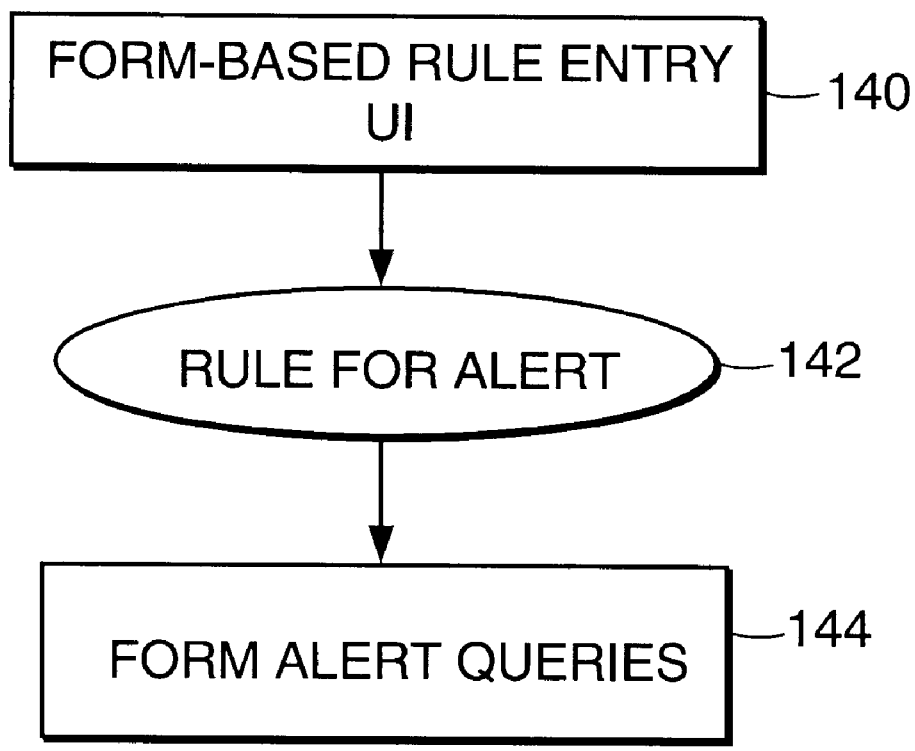
FIG. 5 is a flow chart showing an example embodiment of steps performed by the query GUI to generate alert queries.

Now with reference to FIG. 5, there is described an example embodiment of steps performed by the Query GUI 70 in FIG. 2 to generate an alert query, such as Alert Queries 92. At step 140, the Query GUI 70 displays a form or template to the user, for example, in IF (condition)/THEN (action) format. The user indicates, for example, that upon receipt of a message having the word "urgent" in the subject field of an e-mail message the system should alert the user by creating a notification pop-up window. As a result, a corresponding Rule 142 is formed into an alert query at step 144. The alert query, for example, is $SUBJECT_{13}FIELD:URGENT$, and is stored, for example, in a file named Alert Query 1, corresponding to Alert Query AQ1 in FIG. 2. The disclosed system is further capable of processing and storing compound alert queries similarly as in steps 106 through 112 in FIG. 3.

Figure 6:
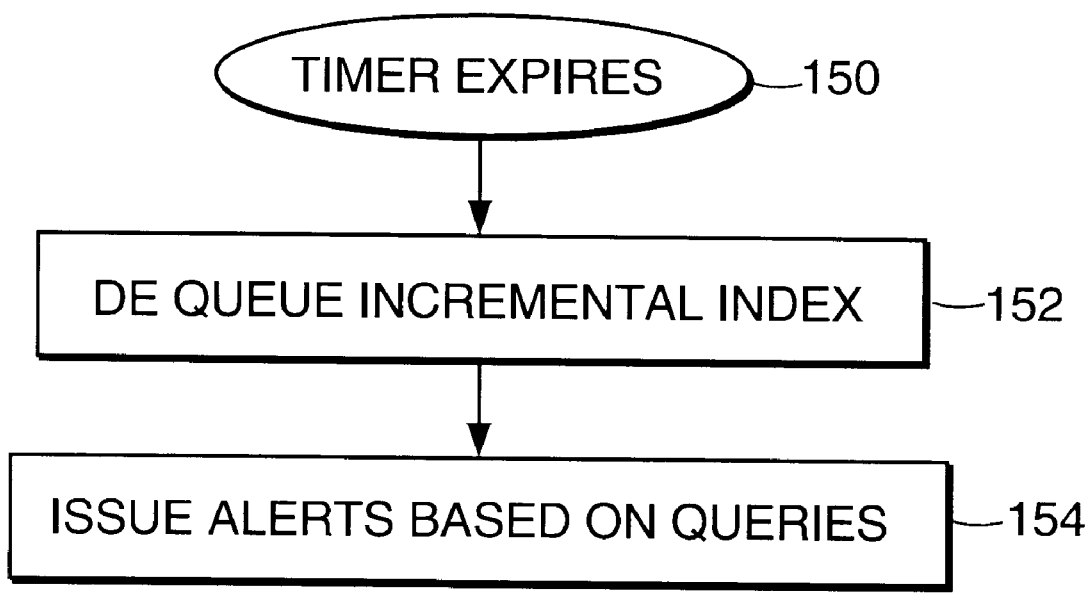
FIG. 6 is a flow chart showing an example embodiment of steps performed by the alert engine to issue an alert.

FIG. 6 shows an example embodiment of steps performed by the Alert Engine 90 as shown in FIG. 2. At step 150 a trigger event occurs, for example periodic expiration of a timer. In response to the trigger event 150, the Alert Engine

90 dequeues an Incremental Index from the Incremental Index Queue 94. The Incremental Index, for example, contains indices of message portions in messages received during a previous time slice or period. At step 154, the Alert Engine 90 executes all existing alert queries 92 using the Search Engine 86. If the search engine returns any hits, then the predefined alert event is issued for each Alert Query resulting in a hit.

Figure 7:
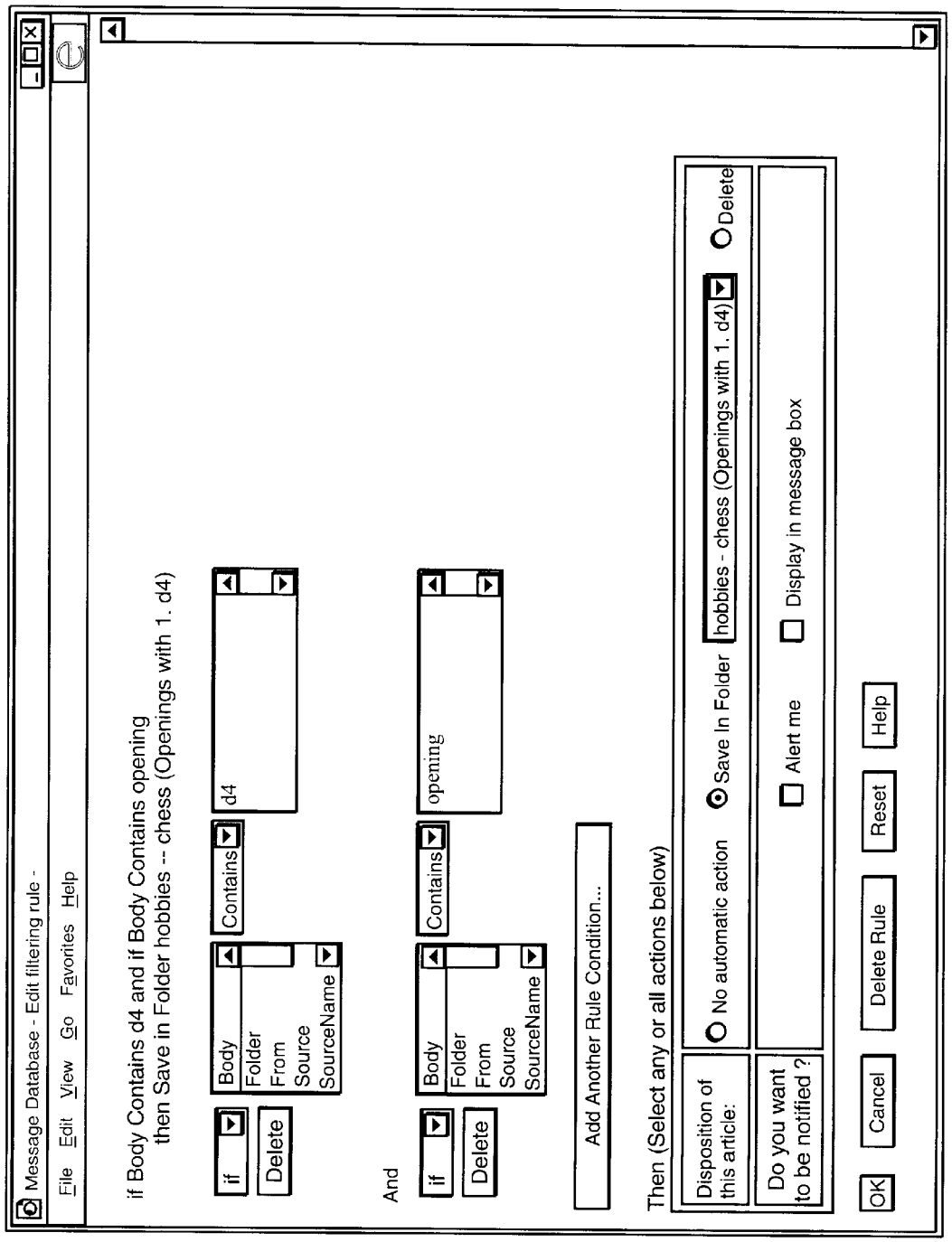
FIG. 7 is an example embodiment of a user interface for inputting folder rules.

FIG. 7 shows an example display 160 formed by the Query GUI 70 as shown in FIG. 2. The display 160 is for example generated during step 102 as shown in FIG. 3. The information received from the user through display 160 is used by the query GUI 70 to generate one or more rules, such as Rule 104 as shown in FIG. 3. For example, using the display 160 the user may define a rule which causes the disclosed system to store messages whose message body contains the text string "d4" as well as the text string "opening" into a folder named "hobbies—chess (openings with 1.d4)". The user may also indicate that a predefined alert be issued upon receipt of such a message. The display 160 also prints out the rule resulting from the user's inputs, in this case: "If Body contains d4 and if Body contains opening then Save in Folder hobbies—chess (Openings with 1.d4)".

FIG. 8 shows a set of rules 165 for example generated by the Query GUI 70 in response to a number of user inputs. The set of rules 165 for example are equivalent to the Compound Queries 112 as shown in FIG. 3. In a first example embodiment the set of rule 165 must be converted to the syntax of the Search Engine 86 before being executed. In a second example embodiment the set of rule 165 are stored in a format that is understood by the Search Engine 86.

FIG. 9 shows an example display 170 corresponding to the display generated at step 128 of FIG. 4. The display 170 for example shows the names of all existing folders as well as the number of messages stored within each existing folder.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A system for organizing received information for a user, comprising:
    a received information database storing a received message;
    a filter responsive to said received message, said filter generating indices of portions of said received message, said filter storing said indices into a index database such that said indices (i) are associated with said portions and said received message, and (ii) enable subsequent retrieval of said received message from a search on the indices;
    a plurality of message folders, each folder storing a previously defined search query; and
    a search engine coupled to said received information database, said index database and said plurality of message folders, in response to user selection of a desired one of the message folders the search engine (i) searching at least said index database for received messages satisfying a search query stored in the user selected message folder and (ii) enabling display of received messages satisfying said search query, such that received messages appear to a user to be stored in the user selected message folder.

2. The system of claim 1, further comprising:
    a viewing graphical user interface for receiving indication of said user selected one of the message folders.

3. The system of claim 1, further comprising:
    a query graphical user interface for inputting said previously defined search query in one or more of said message folders in the plurality of message folders.

4. The system of claim 1, wherein said portions of said received message are words and the index database is a text database.

5. The system of claim 1, wherein said received message further comprises a number of fields, wherein said database index is organized into sub-indexes, each one of said sub-indexes corresponding to one of said message fields.

6. The system of claim 1, wherein said received message is associated with a first message source, and wherein said message filter is responsive only to messages received from said message source.

7. The system of claim 6, further comprising:
    a second message source; and
    a second message filter responsive to messages received from said second message source.

8. The system of claim 5, wherein one of said number of fields is a subject field.

9. The system of claim 5, wherein one of said number of fields is an organization field.

10. The system of claim 5, wherein one of said number of fields is an electronic signature field.

11. The system of claim 2, wherein said search engine provides a set of search results to said viewing graphical user interface for display of received messages satisfying the search query.

12. The system of claim 11, wherein said viewing graphical user interface further comprises:
    code for displaying a set of messages indicated by said search results.

13. The system of claim 1, further comprising:
    an alert engine that generates alert events in response to an incremental index, wherein said incremental index includes indices of message portions in messages received during a previous time slice or period.

14. The system of claim 13, wherein said alert events include a bell sound.

15. The system of claim 13, wherein said incremental index is one of a plurality of incremental indexes stored in an incremental index queue.

16. The system of claim 13, wherein said alert engine is responsive to one or more alert queries, and wherein said alert engine uses said search engine to execute said one or more alert queries.

17. A method for organizing received information for a user, comprising:
    storing a received message in a received information database;
    generating indices of portions of said received message,
    storing said indices into a index database such that said indices (i) are associated with said portions and said received message, and (ii) enable subsequent retrieval of said received message from a search on the indices;
    storing a plurality of previously defined search queries in a corresponding plurality of message folders; and in response to user selection of a desired one of the message folders, (i) searching at least said index database for received messages satisfying one of said plurality of previously defined search queries stored in the user selected message folder and (ii) enabling display of received messages satisfying said one of said plurality of previously defined search queries, such that received messages appear to a user to be stored in the user selected message folder.

18. The method of claim 17, further comprising:
receiving indication of said user selected message folder through a viewing graphical user interface.

19. The method of claim 17, further comprising:
inputting said plurality of previously defined search queries within said plurality of message folders through a query graphical user interface.

20. The method of claim 17, wherein said portions of said received message are words.

21. The method of claim 17, wherein said received message further comprises a number of fields, wherein said database index is organized into sub-indexes, each one of said sub-indexes corresponding to one of said message fields.

22. The method of claim 17, wherein said received message is associated with a first message source, and wherein said message filter is responsive only to messages received from said message source.

23. The method of claim 22, further comprising receiving a second message, by a second message filter, from a second message source.

24. The method of claim 21, wherein one of said number of fields is a subject field.

25. The method of claim 21, wherein one of said number of fields is an organization field.

26. The method of claim 21, wherein one of said number of fields is an electronic signature field.

27. The method of claim 18, further comprising providing a set of search results to said viewing graphical user interface for display of received messages satisfying said ones of search queries.

28. The method of claim 27, further comprising said viewing graphical user interface displaying a set of messages indicated by said search results.

29. The method of claim 17, further comprising:
generating alert events, by an alert engine, in response to an incremental index, wherein said incremental index includes indices of message portions in messages received during a previous time slice or period.

30. The method of claim 29, wherein said alert events include a bell sound.

31. The method of claim 30, wherein said incremental index is one of a plurality of incremental indexes stored in an incremental index queue.

32. The method of claim 30, wherein the step of searching is performed by a search engine coupled to the received information database, the index database and the plurality of message folders, and
said alert engine is responsive to one or more alert queries, and wherein said alert engine uses a search engine to execute one or more alert queries.

33. A computer program product, including a computer readable media, said computer readable media having computer program code for organizing received information for a computer user encoded thereon, said computer program code comprising:
program code that stores a received message in a received information database;

filter code, responsive to said received message, that generates indices of portions of said received message, said filter code storing said indices into a index database such that said indices (i) are associated with said portions and said received message, and (ii) enable subsequent retrieval of said received message from a search on the indices;
program code that stores a plurality of previously defined search queries in a corresponding plurality of message folders; and
search engine code that in response to user selection of a desired one of the message folders, (i) searches at least said index database for received messages satisfying one of said plurality of previously defined search queries stored in the user selected message folder, and (ii) enables the display of received messages satisfying said ones of search queries, such that received messages appear to a user to be stored in the user selected message folder.

34. The computer program product of claim 33, said computer program code further comprising:
a viewing graphical user interface code, for receiving indication of said user selected message folder.

35. The computer program product of claim 33, said computer program code further comprising:
program code for inputting said plurality of previously defined search queries within said plurality of message folders through a query graphical user interface.

36. The computer program product of claim 33, wherein said portions of said received message are words.

37. The computer program product of claim 33, wherein said received message further comprises a number of fields, wherein said database index is organized into sub-indexes, each one of said sub-indexes corresponding to one of said message fields.

38. The computer program product of claim 33, wherein said received message is associated with a first message source, and wherein said message filter is responsive only to messages received from said message source.

39. The computer program product of claim 38, further comprising program code for receiving a second message, within a second message filter, from a second message source.

40. The computer program product of claim 37, wherein one of said number of fields is a subject field.

41. The computer program product of claim 37, wherein one of said number of fields is an organization field.

42. The computer program product of claim 37, wherein one of said number of fields is an electronic signature field.

43. The computer program product of claim 34, wherein the search engine code further provides a set of search results to said viewing graphical user interface code for display of received messages satisfying said ones of search queries.

44. The computer program product of claim 43, wherein said viewing graphical user interface code further displays a set of messages indicated by said search results.

45. The computer program product of claim 33, further comprising:
alert engine code for generating alert events in response to an incremental index, wherein said incremental index includes indices of message portions in messages received during a previous time slice or period.

46. The computer program product of claim 45, wherein said alert events include a bell sound.

47. The computer program product of claim 46, wherein said incremental index is one of a plurality of incremental indexes stored in an incremental index queue.

48. The computer program product of claim 46, wherein said alert engine code is responsive to one or more alert queries, and wherein said alert engine code uses said search engine code to execute said one or more alert queries.

49. A system for organizing received information for a user, comprising:

a received information database storing a received message;

a filter responsive to said received message, said filter generating indices of portions of said received message, said filter storing said indices into a index database such that said indices are associated with said portions and said received message;

plurality of message folders, each folder storing a previously defined search query; and a search engine responsive to said received information database, said index database and said plurality of message folders, for searching said received information database responsive to a search query stored in a selected one of said plurality of message folders; and an alert engine that generates alert events in response to an incremental index wherein said incremental index includes indices of message portions in messages received during a previous time slice or period.

50. The system as claimed in claim 49 wherein said alert events include a bell sound.

51. The system of claim 49 wherein said incremental index is one of a plurality of incremental indices stored in an incremental index queue.

52. The system of claim 49 wherein said alert engine is responsive to one or more alert queries and wherein said alert engine uses said search engine to execute said one or more alert queries.

53. A method for organizing received information for a user, comprising:

storing a received message in a received information database;

generating indices of portions of said received message, by a filter responsive to said received message, said filter storing said indices into a index database such that said indices are associated with said portions and said received message;

storing a plurality of previously defined search queries in a corresponding plurality of message folders;

searching said received information database, by a search engine responsive to said received information database, said index database and said plurality of message folders, said searching including performing one of said plurality of previously defined searched queries stored in a selected one of said plurality of message folders using said search engine; and generating alert events by an alert engine in response to an incremental index wherein said incremental index includes indices of message portions in messages received during a previous time slice or period.

54. The method of claim 53 wherein said alert events include a bell sound.

55. The method of claim 53 wherein said incremental index is one of a plurality of incremental indices stored in an incremental index queue.

56. The method of claim 53 wherein said alert engine is responsive to one or more alert queries and wherein said alert engine uses said search engine to execute said one or more alert queries.

57. A computer program product, including a computer readable media, said computer readable media having computer program code for organizing received information for a computer user encoded thereon, said computer program code comprising:

program code that stores a received message in a received information database;

filter code, responsive to said received message, that generates indices of portions of said received message, said filter code storing said indices into a index database such that said indices are associated with said portions and said received message;

program code that stores a plurality of previously defined search queries in a corresponding plurality of message folders;

program code that searches said received information database, using a search engine responsive to said received information database, said index database and said plurality of message folders, said searching including performing one of said plurality of previously defined search queries stored in a selected one of said plurality of message folders using said search engine; and program code for generating alert events within an alert engine, in response to an incremental index, wherein said incremental index includes indices of message portions in messages received during a previous time slice or period.

58. The computer program product of claim 57 wherein said alert events include a bell sound.

59. The computer program product of claim 57 wherein said incremental index is one of a plurality of incremental indices stored in an incremental index queue.

60. The computer program product of claim 57 wherein said alert engine is responsive to one or more alert queues and wherein said alert engine uses said search engine to execute said one or more alert queues.

* * * * *

UNITED STATES PATENT AND TRADEMARK OFFICE
CERTIFICATE OF CORRECTION

PATENT NO. : 6,226,630 B1
DATED : May 1, 2001
INVENTOR(S) : Meyer Billmers

Page 1 of 1

It is certified that error appears in the above-identified patent and that said Letters Patent is hereby corrected as shown below:

Column 11,
Line 14, before "plurality" insert -- a --.
Line 51, delete "searched" and insert -- search --.

Signed and Sealed this

Thirteenth Day of November, 2001

Attest:

*Attesting Officer*

NICHOLAS P. GODICI
*Acting Director of the United States Patent and Trademark Office*